US009697307B2

(12) United States Patent
Cleary (10) Patent No.: US 9,697,307 B2
(45) Date of Patent: *Jul. 4, 2017

(54) DISCRETE ELEMENT METHOD

(71) Applicant: COMMONWEALTH SCIENTIFIC AND INDUSTRIAL RESEARCH ORGANISATION, Acton, ACT (AU)

(72) Inventor: Paul William Cleary, Clayton (AU)

(73) Assignee: Commonwealth Scientific and Industrial Research Organisation, Capita Territory (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,100

(22) Filed: Oct. 25, 2016

(65) Prior Publication Data
US 2017/0046461 A1     Feb. 16, 2017

Related U.S. Application Data

(63) Continuation of application No. 13/822,879, filed as application No. PCT/AU2011/001183 on Sep. 15, 2011.

(30) Foreign Application Priority Data

Sep. 15, 2010    (AU) ................................. 2010904150

(51) Int. Cl.
*G06G 7/48*     (2006.01)
*G06F 17/50*    (2006.01)

(52) U.S. Cl.
CPC ...... *G06F 17/5009* (2013.01); *G06F 2217/16* (2013.01)

(58) Field of Classification Search
CPC .......................... G06F 17/5009; G06F 2217/16
(Continued)

(56) References Cited

U.S. PATENT DOCUMENTS 7,027,644 B1     4/2006 Kim et al.

FOREIGN PATENT DOCUMENTS

JP     2007/084992 A     3/1995
JP     2007/286514 A     11/2007

OTHER PUBLICATIONS

Tang et al. (Discrete Element Modeling for Shock processess od heterogeneous materials, 2001 (6 pages)).*

(Continued)

*Primary Examiner* — Kamini S Shah
*Assistant Examiner* — Andre Pierre Louis
(74) *Attorney, Agent, or Firm* — Brinks Gilson & Lione (57) ABSTRACT

A discrete element method for modelling granular or particulate material, the method including a multiple grid search method wherein the multiple grid search method is a hierarchical grid search method, and wherein entities, such as particles and boundary elements, are allocated to cells of respective grids based on size. The search method further includes: (a) performing a search of cells in a first of the grid levels to determine pairs of entities which satisfy predetermined criteria to be included in a neighbor list for which both entities belong to the first grid level; (b) mapping each nonempty cell in the first grid level to each of the other grid levels, determining neighboring cells in each of the other grid levels and determining all pairs of entities belonging to pair of levels that satisfy the predetermined criteria for inclusion in the neighbor list; and (c) repeating (a) and (b) for all grid levels.

25 Claims, 4 Drawing Sheets

(58) Field of Classification Search
USPC .......................................................... 706/6
See application file for complete search history.

(56) References Cited

OTHER PUBLICATIONS

Chen, L. et al., An Improved Algorithm for Determining Neighborhood for DEM Simulation, "*Chinese Journal of Computational Mechanics,*" vol. 17, No. 4 (2000), pp. 497-499—English Abstract Only; Non-patent document considered relevant to Chinese Patent Application No. 201180053988.2, as noted in English-language translation of Chinese Office action dated Jul. 2, 2015.).
He, Kejing, et al., "Multigrid Contact Detection Method," *Physical Review E,* 75 (2007) pp. 036710-1-036710-7.
Hu, G. et al., Applications of DEM in Industrial Process Analysis and Product Design, "*Journal of Mechanical Electrical Engineering,*" vol. 27, No. 8 (2010), pp. 26-30—English Abstract Only; Non-patent document considered relevant to Chinese Patent Application No. 201180053988.2, as noted in English-language translation of Chinese Office action dated Jul. 2, 2015.).
Peters, John et al., "A Hierarchical Search Algorithm for Discrete Element Method of Greatly Differing Particle Sizes," *Emerald Engineering Corporation,* 26, 6 (2009) pp. 621-635.
Sawley, Mark, et al., "A Parallel Discrete Element Method for Industrial Granular Flow Simulations," *EPFL Supercomputing Review,* (1999) pp. 23-29.
Williams. J.R. et al., "Discrete Element Simulation and the Contact Problem," *Archives of Computational Methods in Engineering,* 6, 4 (1999) pp. 279-304.
International Preliminary Report on Patentability dated Mar. 19, 2013 and Written Opinion for International Patent Application No. PCT/AU2011/001183 dated Oct. 31, 2011, 7 pp.
International Search Report for International Patent Application No. PCT/AU2011/001183 dated Nov. 4, 2011, 3pp.
1$^{st}$ Office Action dated Jul. 2, 2015 and Search Report for Chinese Patent Application No. 201180053988.2, filed Sep. 15, 2011, 19 pages (translated).
Office Action for Japanese Patent Application No. 2013-528469, dated Sep. 1, 2015, 5 pages (translated).

\* cited by examiner

DISCRETE ELEMENT METHOD

CROSS-REFERENCE TO EXISTING APPLICATIONS

This application is a continuation of U.S. application Ser. No. 13/822,879 filed on Jul. 24, 2013, which is the National Stage of International Application No. PCT/AU2011/001183 filed with the Australian Patent Office on Sep. 15, 2011, which claims priority to Australian Patent Application No. 2010904150, filed on Sep. 15, 2010, wherein the entirety of each of the aforementioned applications is hereby incorporated by reference.

FIELD

The present invention relates to a discrete element process. In particular, the invention relates to a discrete element method for modelling granular or particulate material.

BACKGROUND

The Discrete Element Method (DEM) is a process executed by a computer system that allows the prediction of the flow and structure of granular (particulate) materials. The principle physics associated with the process is that of collisions between particles and between particles and solid bodies (such as equipment). Examples of applications of the process include, but are not limited to:
  (i) Crushing and grinding of rocks in mineral processing, where the data produced by the process provides information about the flow and breakage of particles for the purposes of improving process efficiency, production rate and the equipment design and reducing equipment wear;
  (ii) Mixing of powders and grains for food, plastics, pharmaceuticals and household product manufacture, where the data produced by the process provides information about flow, mixing, particle growth, breakage and agglomeration for the purposes of improving the mixing process and the equipment design;
  (iii) Transport and flow of particles through processing equipment, where the data produced by the process provides information used to understand and optimise equipment design;
  (iv) Digging and excavation, where the data produced by the process provides information used to improve efficiency;
  (v) Rock cutting and fragmentation, where the information is used to improve cutting efficiency and reduce equipment wear;
  (vi) Landslides and debris flow, where the data produced by the process provides information used for planning, mitigation and disaster response management.

In a DEM simulation there will be many particles, each with specific attributes such as size, shape, density and collision properties. There will also often be boundary objects which can have an arbitrarily complex shape typically represented as surface meshes or by trimmed geometric primitives such as lines, planes, cylinders, arcs etc.

A basic DEM process proceeds by time marching, where the system evolves from one known state to new one by a small increment in time, and an update of all the state information is generated. There are three elements:
  (i) determine which particles are in contact;
  (ii) for particles that are in contact with other particles or boundaries calculate the forces between them; and
  (iii) sum the net forces and torques on the particles and objects and integrate their motion to predict new positions, orientations, velocities and spins.

The process for determining which particles are in contact can be an enormously complex and computationally expensive part of the method and so specific approaches have been developed to reduce these costs to manageable levels.

The simplest approach, whose cost is of the order of $N^2$, where N is the number of particles, is to simply check each pair of possible contact pairs at each timestep. For small values of N (say <1000) this is feasible but very inefficient.

For larger simulations the cost of the contact detection needs to be of order N for the simulation to be feasible. This may be achieved by performing the search for particles that are in contact less frequently and during the search by building a list of pairs of entities (particles or parts of boundary objects) that may collide during a particular period of time from the time of the search. This is sometimes termed the neighbour list or near neighbour list or interaction list. At each timestep the contact detection is performed only for pairs of entities in the neighbour list. A minimum separation of the bodies is specified for inclusion in this neighbour list. Information on the speed of the particles and the minimum separation distance can be used to estimate the minimum duration of validity of the list. This means that it is impossible for any collision to occur between entities that are not in the neighbour list. In this way only these pairs need to be checked at each timestep creating considerable savings. When this period of validity is exceeded, the process cannot guarantee that entities will not overlap without a contact first being detected. The neighbour list then needs to be updated. Typically this is done by performing a new search.

A DEM process may therefore use two nested loops. The outer loop controls the timing of the search and the construction/or update of the neighbour list. For each incarnation of the neighbour list, the inner loop causes a series of timesteps to be performed, marching the system forward in time using the list to supply pairs to be checked for contact and for any subsequent calculation for those that are. The forces are then summed and the particles and object motions are integrated.

Figure 1:
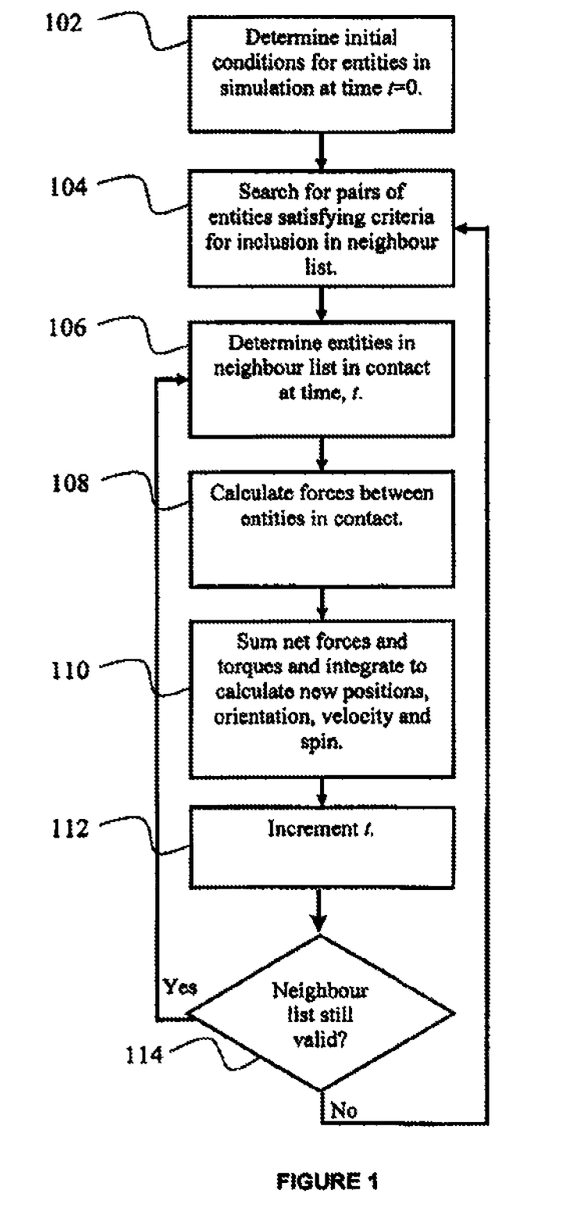
FIG. 1 is a flowchart illustrating the general form of a DEM process for modelling granular or particulate material.

The principles of such a DEM simulation process are illustrated for clarity in FIG. 1 for a given simulation environment, having a mixture of particles with predetermined attributes as listed above, and having predetermined boundary objects (such as the walls of a container, for example).

First, the initial positions (including cell locations), orientations, velocities and spin for each of the particles in the simulation are determined for time t=0 at step 102. At step 104, the neighbour list is determined as discussed above to include pairs of entities (particles or boundary objects). At step 106, pairs of entities in the neighbour list are considered to determine whether they are in contact with each at time t. For each pair of entities in contact with one another or, the net forces on the entities, and their torques are calculated at step 108 and integrated at step 110 to determine new positions, orientations, velocities and spins for the entities concerned.

At step 112, time, t, is incremented and, at step 114, t is compared with the period of validity of the neighbour list to determine whether that period has expired. If it has, the process retinue to step 104 and the search for potentially interacting entities is repeated; if it has not, the process returns to step 106 and steps 106 to 114 are repeated.

For the sake of completeness it is noted that, in addition to the collision forces calculated for the DEM method, additional forces can be included to represent the influence of other factors, such as interstitial slurries, inter-particle cohesion, electromagnetic effects and other body forces. These forces are added to the collision forces to give net forces on the particles which are used in the integration of Newton's equation to predict the motion of the particles and objects.

Furthermore, in addition, to determining the motion of the particles and objects, the DEM method also involves generating outputs based on the motion which are used for understanding and describing the processes being modelled. These include, but are not limited to prediction of energy flows and dissipation, wear on the boundary objects, breakage and growth of the particles and information on mixing and segregation.

In the DEM method, the particles can change in number and their attributes can change with time. These can result from flow into and out of the computational domain, breakage of particles, processes to destroy and create particles, agglomeration, erosion and shape change.

Many search methods, performed at step 104 of FIG. 1, have been developed and most rely on the use of a grid to perform localisation of the particles and parts of boundary objects. Some rely on ordered lists, some on tree subdivision and some others on building meshes (such as with Voronol tessellation). Typically, non-grid methods are not of order N, but are often of order N log(N) making them unsuited to large scale DEM simulation.

Grid based searches use a regular grid of square (in two dimensions) and cubic cells (in three dimensions) which are overlayed over the particles and objects. These entities (particles and object components) are mapped into the cells of the grid and stored in some form of structure for each grid cell. Neighbours of particles in a given cell can be found by checking for entities that lie within neighbouring cells. Since the neighbour cells of a known cell are simple to identify, the grid localises the search from the entire solution space to a known and identified subset whose contents are then easily identified.

The main decision to make when using a grid is the size of the cells to be used and the number of cells around any cell that need to be checked for neighbours. There are three main options:

(1) The cell size is small enough so that the smallest particle in the simulation only just fits into the cell. This guarantees that there can only be one particle per cell and so storage of the particles in a cell is very simple. When finding neighbours of a particle, the search has to be performed by checking enough cells on all sides so that any cell containing the largest particle in the system which is close enough to be a neighbour can be detected. The physical distance that needs to be searched is controlled by the sum of the entity sizes (i.e. sum of particle radii for spherical particles). The weakness of this approach is that as the particle size ratio or degree of poly-dispersity (meaning the ratio between the largest and the smallest particles) increases, the number of cells that cover this physical search space becomes very large. For example with a 100:1 size ratio, the largest particle will cover around 100 cells in each direction. The worst case is two proximate large particles. This requires searching a cube of cells of size $300^3$ (or 27 million cells). This has to be repeated for finding the neighbours of each cell in the grid. The cost of all these checks becomes larger with increasing size ratio and search performance degrades substantially.

(2) The cell size is just large enough to cover the largest particle. In this case, the physical search space is always covered by a cube of 3 cells in each direction—one cell on each side of the base cell whose neighbours are being searched in each of the three dimensions (i.e. 27 cells). So the identification of neighbour cells is very simple and fast. This method though means that there can be many particles within each cell. Some form of storage structure such as a list, link list or hash table is required to store the identity of particles and object components within each cell. Looking these up adds to the expense of this search variant. This approach works well for modest poly-dispersity but degrades strongly as the particle size ratio increases. The principle reason for this is that the grid localises the search to specific cells very effectively, but the checking of pairs within each cell and between cells is pair-wise for all combinations of entities within these cells. This process is of order $M_1 \times M_2$, where $M_1$ and $M_2$ are the number of entitles within the two cells being considered. As the particle size range increases, the number of particles within each cell increases (cubically). Since fine particles tend to segregate in most granular flows, the worst case is a cell full of the finest (smallest) particles being checked against a similar cell. For example, for a size ratio of 100:1, there could be $10^6$ fine particles per cell, so the cost of checks between adjacent cells is of the order of $10^{12}$ checks per pair of cells or $10^{13}$ per central cell. This cost rapidly becomes extremely high and algorithm performance is seriously degraded.

(3) A cell size in between that of options 1 and 2. This has the weaknesses of both methods in that it needs to store multiple particles per cell and search out a size distribution dependent number of cells around each central cell. The algorithm can degrade both because of checking large numbers of empty cells or cells with the same large particle or because of concentrations of fine particles leading to large numbers of pair checks between cells.

All variants of the grid search degrade sharply with increasing particle size range. Typically size ratios of 10:1 start to become more expensive than for relatively monosized particles. Size ratios of 100:1 tend to become too expensive to simulate and so simulations are restricted to moderate size ranges.

It is desired to address the above or at least provide a useful alternative.

SUMMARY

In accordance with the present invention there is provided a discrete element method including a multiple grid search method. This may involve a hierarchical grid search method, wherein entities, such as particles and boundary elements, are allocated to cells of respective grids based on size.

The search method may search cells of grids for contact between entities, each grid belonging to a respective level of a grid hierarchy, and include:

(a) performing a search for a grid level to determine pairs of entities to be included in a neighbour list for which both entities belong to the grid level;

(b) mapping each non-empty cell in the grid level to each of the other grid levels, determining neighbouring cells in each of the other grid levels and determining all pairs of entities belonging to a pair of levels that are proximate for inclusion in the neighbour list; and (c) repeating (a) and (b) for all grid levels of the hierarchy.

A search may be performed partially or locally at times based on duration of validity of data associated with the entities. The times may be determined based on speed of the entities.

The discrete element method may include the steps of:
(a) analysing a particle size distribution for a particle mixture to be modelled;
(b) in dependence upon the particle size distribution, determining a grid hierarchy comprising a plurality of grid levels, each having a respective grid size, into which to map the particles including, for each grid level, determining a respective particle size range;
(c) mapping the particles into the plurality of grid levels in dependence upon their respective sizes and the particle size ranges associated with the grid levels;
(d) determining criteria for inclusion of a pair of particles in a neighbour list;
(e) searching each of the grid levels for pairs of particles satisfying the criteria for inclusion in the neighbour list, and searching each possible combination of two grid levels for pairs of particles satisfying the criteria for inclusion in the neighbour list; and
(f) periodically examining the pairs of particles included in the neighbour list to determine whether they are in contact with one another.

The step of determining a hierarchy of grid levels may include determining each successive grid level to differ from a preceding level by a predetermined size factor.

The step of determining the hierarchy of grid levels may includes determining for each grid level a respective particle size range such that the respective particle size range associated with each grid level includes the respective grid size of that grid level. In such cases, the step of determining the hierarchy of grid levels may include merging grid levels in dependence upon respective numbers of particles falling within the respective particle size ranges. Additionally or alternatively, the step of determining the hierarchy of grid levels may include modifying the respective particle size ranges in dependence upon respective numbers of particles falling within them.

The step of mapping the particles may include allocating each particle to the grid level whose particle size range includes the size of the particle, and mapping each particle to a single cell of the grid level to which it is allocated.

The criteria for inclusion of a pair of particles within a neighbour list may include a closing speed of the pair of particles or a distance between the pair of particles or a time until collision of the particles.

The method may include the step of determining a time of validity of the neighbour list, and the method may include repeating the searching step upon expiry of the time of validity of the neighbour list.

The method may include determining a plurality times of validity, each relating to a subset of the plurality of grid levels, and repeating the searching step in connection with the respective subset upon expiry of one of the plurality of tires of validity.

The or each neighbour list may be valid for all particles. Alternatively, a respective additional time of validity may be determined in connection with a particular particle, and searching may be conducted for pairs of particles including the particular particle, satisfying the criteria for inclusion in the neighbour list, upon expiry of the additional time of validity.

The step of searching each possible combination of two grid levels may include mapping non-empty cells of one of the two grid levels into a relevant cell of the other of the two grid levels and searching for pairs of particles including one particle from each of the two grid levels which satisfy the criteria for inclusion in the neighbour list.

The method may include the step of mapping a boundary element having a size falling within a size range of a grid level into that grid level, in which case the searching step includes searching for particles which satisfy the criteria for inclusion in the neighbour list with the boundary element.

The method may include the step of mapping a boundary element having a size larger than an upper bound of the size range allocated to a highest grid level into the highest grid level. In such cases, the method may further include mapping the boundary element into each cell of the largest grid level in which a part of the boundary element is found.

The present invention also provides a particle simulation system including a computer configured to execute the process.

The present invention also provides computer readable storage including computer program code for performing the process.

DESCRIPTION OF THE DRAWINGS

Preferred embodiments of the present invention are hereinafter described, by way of example only, with reference to the accompanying drawings, wherein.

DETAILED DESCRIPTION

Figure 2:
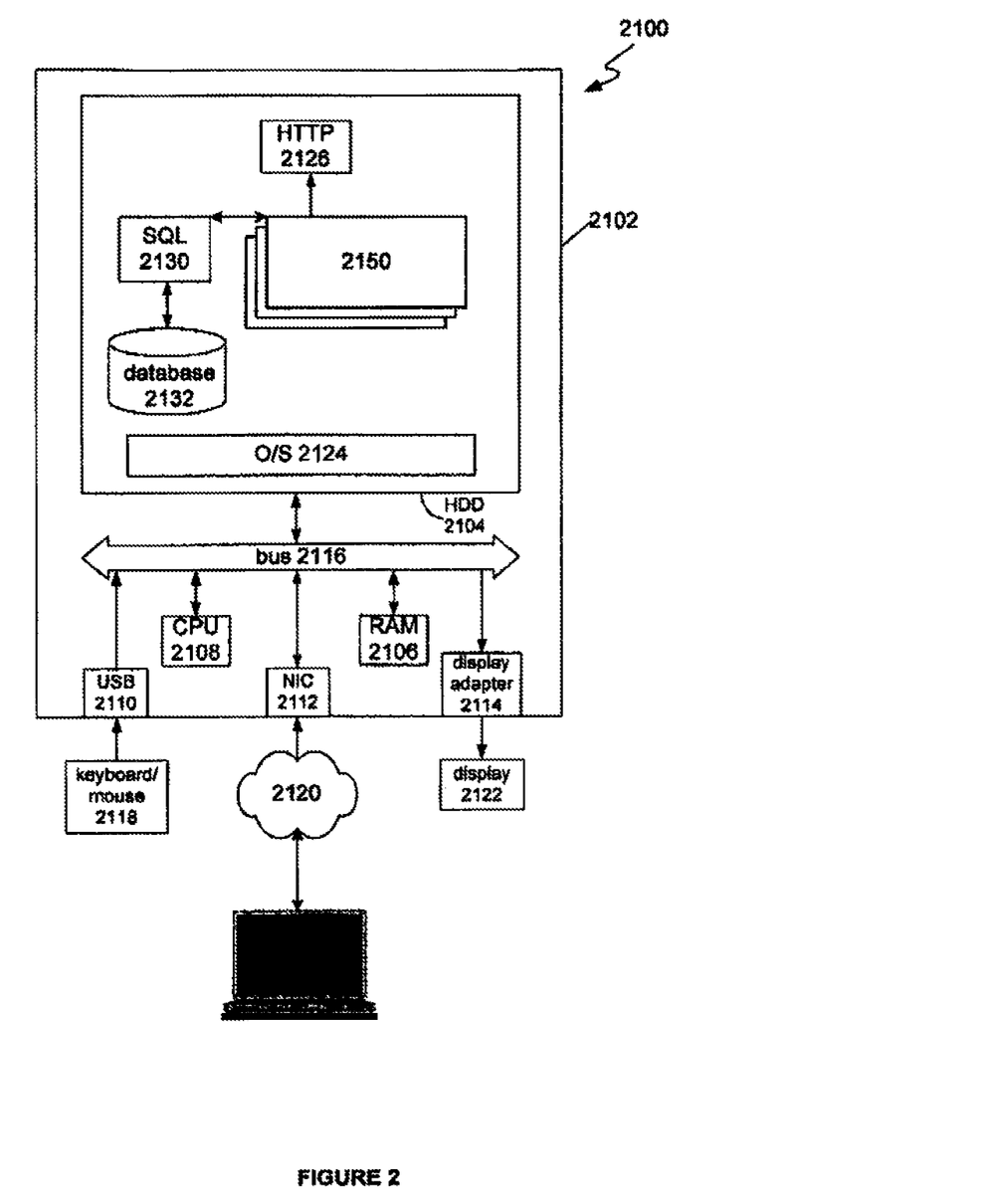
FIG. 2 is a block diagram of a preferred embodiment of a particle simulation system according to the present invention.

A particle simulation system 2100, as shown in FIG. 2, is implemented using a computer system 2102. The computer system 2102 is based on a standard computer, such as a 32 or 64 bit Intel architecture computer produced by Lenovo Corporation, IBM Corporation, or Apple inc. The processes executed by the computer 2102 are defined and controlled by computer program instruction code and data of software components or modules 2150 stored on non-volatile (e.g. hard disk) storage 2104 of the computer 2102. The processes performed by the modules 2150 can, alternatively, be performed by firmware stored in read only memory (ROM) or at least in part by dedicated hardware circuits of the computer 2102, such as application specific integrated circuits (ASICs) and/or field programmable gate arrays (FPGAs).

The computer 2102 includes random access memory (RAM) 2106, at least one microprocessor 2108, and external interfaces 2110, 2112, 2114 that are all connected by a system bus 2116. The external interfaces include universal serial bus (USB) interfaces 2110, a network interface connector (NIC) 2112, and a display adapter 2114. The USB interfaces 2110 are connected to input/output devices, such as a keyboard and mouse 2118. The display adapter 2114 is connected to a display device, such as an LCD display screen 2122. The NIC 2112 enables the computer 2102 to connect to a communications network 2120, such as the Internet. The computer 2102 includes an operating system (OS) 2124, such as Microsoft Windows, Mac OSX, or Linux. The computer 2102 also includes web server code 2126, such as Apache, and a database management system (DBMS) 2130, such as MySQL, to provide structured query language support and to enable maintenance of and access to data stored in an SQL database 2132 of the system 2100. The web server 2126, DBMS 2130 and the modules 2150 all run on the OS 2124. The modules 2150 may include markup language code (such as HTML, XML, XHTML), scripts (such as PHP, ASP and CGI), image files, style sheets and program code written using languages such as C, C#, Ruby or PHP. For the scripts, the modules would include a runtime engine for compilation in real time. The modules 2150 may also be implemented using a framework, such as Microsoft-.Net or Ruby On Rails. The modules 2150 can then include computer program classes, methods and files as part of the framework using computer program instruction code such as Ruby or Java. The computer 2102 is able to generate and provide code elements for user interfaces that are served by the web server 2126 and requested by a remote web browser on a client computer 2160 that is connected to the computer 2102 over the network 2120.

The modules 2150 control performance of a DEM process, as described with reference to FIG. 1, that is executed by the particle simulation system 2100. The DEM process of the system 2100 executes a multiple grid search method, as described below with reference to FIG. 3, that uses a number of different search grids each suited to a specific sub-range of the size distribution of the entities, i.e. particles and boundary elements, that are the subject of the search executed by the process. This can also be called a hierarchical grid search method.

The particle size distribution is analysed and the number of grid levels is chosen, each with a specific cell size and each with a specific sub-set of the particle size range assigned to it. These sub-site ranges are significantly narrower than the original particle size range and so any standard grid search applied to any of these sub-levels is substantially improved in performance. Particles are then allocated into their home grid in one of the three ways described previously. Particles are mapped into cells within the grid based upon their centre of mass. That is to say, the particle is considered to reside in the cell which contains its centre of mass. In the event that the centre of mass falls precisely on a boundary between candidate cells, the particle is considered to reside in the candidate cell having the lowest rank, file, and layer ordinal value.

Boundary elements (being parts of solid objects with which particles can interact) an also analysed for their size range and mapped into the appropriate grid level and cell by the methods discussed below.

In the case of boundary elements having a size within the range of the particles under consideration, they are subject to the same considerations and are mapped in the same was as particles. However, in the case of boundary elements which are larger than particles, they are allocated, in a preferred embodiment, to the largest grid level. Nonetheless, the elements are still larger than the grid cells. In such cases, in a preferred embodiment, the element is treated as though it is present in each cell in which a part of the element may be found. So data processing is performed in which every cell that the element passes through is identified and a marker is added to the local list of entities within the cell to indicate that that particular boundary element is present in the cell and should be checked against other particles.

However, in the case of boundary elements that are smaller than the largest particles but bigger than the smallest, mapping them to the largest grid level generates unnecessarily large number of particle-element combinations to search. In these cases, in a preferred embodiment, the elements are also mapped into at least one smaller grid level. Consideration of interactions between particles and elements is then performed using the lowest grid level that is higher in the grid hierarchy than the current particle level. That is to say, if a boundary element is considered allocated to grid levels 4 and 5 of a hierarchy, interaction between it and a particle in grid level 2 is considered only in the combination of grid levels 2 and 4. Considering it again when searching the combination of grid levels 2 and 5 is redundant.

The search for pairs (step 104 of FIG. 1) then proceeds as follows:

(1) A first grid level is chosen. In one preferred embodiment, the grid level having the smallest cells is chosen first. One of the standard grid searches is performed on just that level. This finds all prospective pairs of entities that need to be included in the neighbour list for which both entities belong to that grid level.

(2) For each non-empty cell in that first grid level, that cell is mapped into each of the other grid levels. Sufficient neighbouring cells in each of these other grid levels are identified and checked against the original cell to find all pairs of entities belonging to that pair of levels that are proximate enough to be require inclusion in the neighbour list based upon predetermined criteria for inclusion, e.g. a single criterion of a minimum separation distance or multiple criteria.

(3) The process is repeated for each grid level until all possible pairs of grid levels have been checked against each other.

Figure 3:
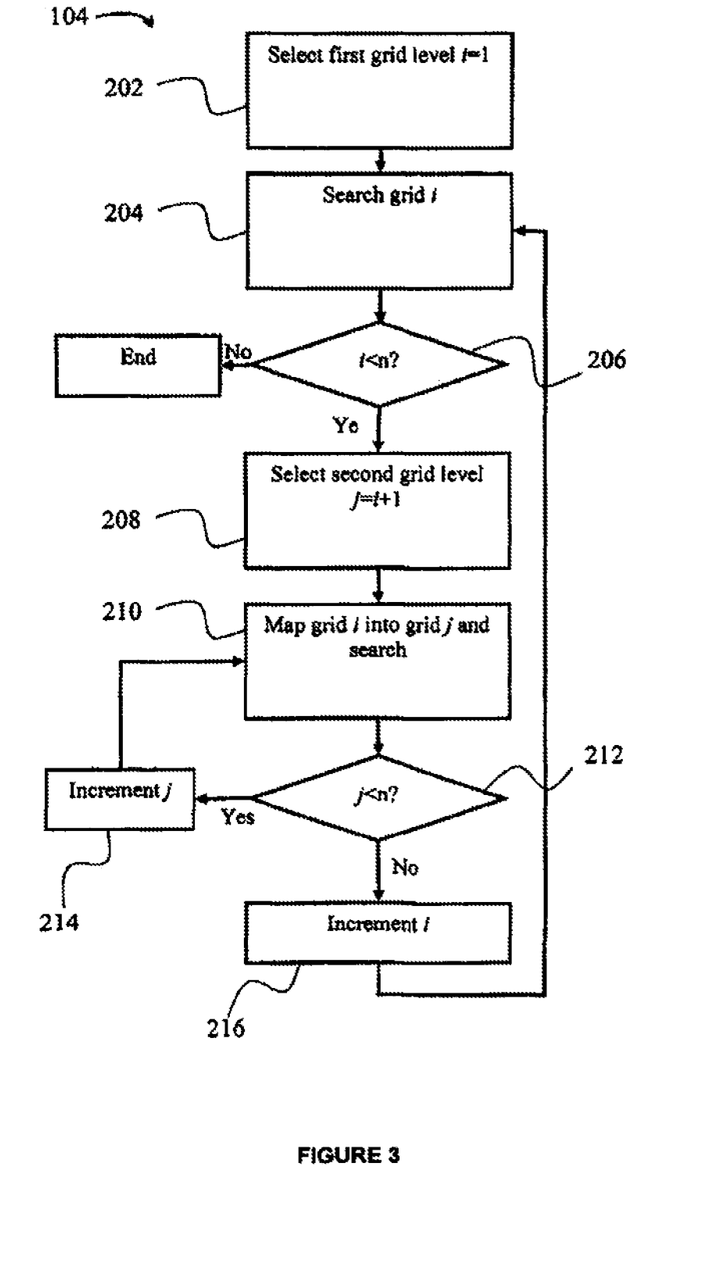
FIG. 3 is a flow diagram illustrating a search method of a DEM process executed by the simulation system of FIG. 2.

This is illustrated in FIG. 3 in connection with a general grid hierarchy having n grid levels ranging from the one with the smallest cell size (grid level 1) to the largest (grid level n). In overview, each grid level is first searched alone and then in combination with each larger grid level. In this way, all grid levels and all combinations of two grid levels are considered.

As indicated above, at step 202, a first grid level i is chosen (l=1). At step 204, this grid level is searched. By "searched" in this context is meant that all possible pairs of entities (particles or boundary elements) are considered to determine whether they satisfy the criteria for inclusion in the neighbour list (discussed below).

At step 206, i is compared with the number of grid levels n. If i is less then n (i.e. there remain further grid levels to consider), at step 208, a second grid level j is chosen to be searched in combination with grid level i. In the first instance, grid level j is the next level up from level i (that is, j=i+1). At step 210, the non-empty cells of grid level i are mapped into grid level j and searched in the same way as with grid level i alone.

At step 212, is compared with the number of grid levels n. If f<n, there are larger grids in combination with which grid level i has not yet been processed. Accordingly, at step 214, j is incremented, and the process returns to step 210 for grid j to be processed in combination with new grid j.

Ultimately, j will reach n meaning that, at step 210, grid level i is processed in combination with grid level n. Once this is done, grid level i has been processed alone and in combination with all higher grid levels. Accordingly, since j is no longer less than n when compared at step 212, the process passes to step 216, at which i is incremented, and then returns to step 204 (that is to say, new grid i is searched alone).

This process is repeated until eventually, i=n. That is to say, the grid level searched alone at step 204 is the largest grid level. This grid level has already been searched in combination with all smaller levels and so this is the final search. Accordingly, when i is compared with n at step 206, the neighbour list is complete, and the process terminates.

There are a number of possibilities for determining the criteria for inclusion in the neighbour list. In one embodiment, a threshold distance is first determined and entities closer than that distance are included. The earliest collision may then be determined with reference to an estimate of the maximum speed in the system, and the list is considered to be valid until that earliest collision. As an alternative to using the maximum speed in the system, the earliest collision may be determined with reference to a likely velocity distribution.

When there is only modest poly-dispersity then only one level needs to be used and the multiple-grid search becomes equivalent to the underlying grid level search being used.

As the degree of poly-dispersity increases the number of levels increases. Compared to a standard search there is additional cost in maintaining multiple search levels and in mapping the cells from one level to others. The cost for each level of the multiple-grid search is low compared to the savings produced by eliminating the issues that cause the degradation of the basic grid searches.

There are a number of ways of determining the number of grid levels used, and the size of the cells in the respective grid levels. In one group of embodiments, of particular use in connection with mixtures having particle size distributions having a number of distinct peaks, grid levels are used having cell sizes corresponding to the particle sizes at which the peaks in the distribution occur. Contiguous ranges of particle size are determined, the range for each grid spanning from smaller to larger than the relevant cell size.

A simple example is a binary mixture of two different sizes. Two grid levels are used with each one tuned to the size of one of the mixture components. The search for fine-fine particles is performed on a fine particle grid level. The search for the coarse-coarse particles is performed on a coarse particle grid level. The fine-coarse particle pairs are found by mapping the fine particle grid cells in the coarse grid and doing local searches around each of those cells or vice versa.

Figure 4:
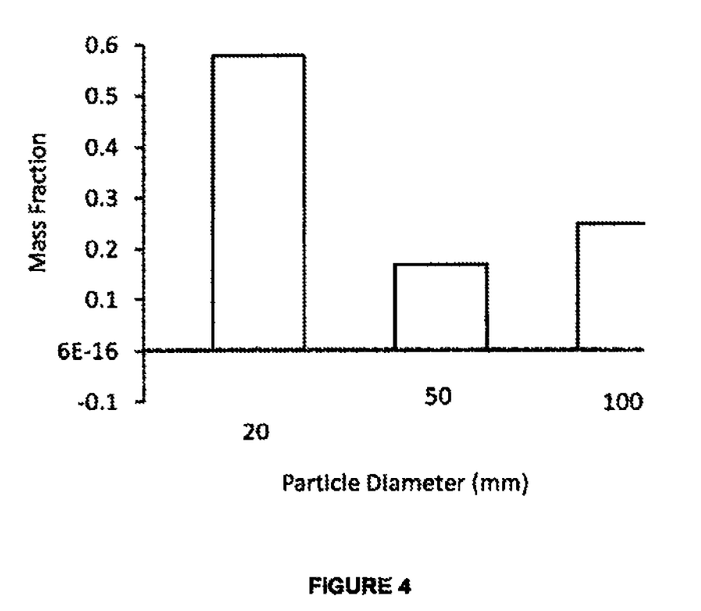
FIG. 4 is an example of a discrete particle size distribution for a mixture of particles of three discrete sizes.

FIG. 4 shows a moderately more complicated exemplary particle size distribution in a particle mixture, being a ternary mixture of particles of three discrete diameters: 20, 50 and 100 mm. In this example, grids of corresponding sizes (that is 20, 50 and 100 mm) are used. Particles up to and including, say, 35 mm are mapped into the 20 mm level; particles greater than 35 mm up to and including, say, 70 mm are mapped into the 50 mm level; and particles larger than 70 mm are mapped into the 100 mm level.

A more general example is that of a broad continuous size distribution. In such cases, a geometric array of nested grid levels can be chosen (say factors of 2 different in scale). For a roughly 100:1 size ratio, seven such grid levels are required to span the size range. Each grid level then owns a sub-range of these particles (the smallest grid owning particles 0 to 2 times the size of the smallest particles; the next owning particles 2 to 4 times that size; then 4 to 8 times, and so on) and each particle is mapped into its home grid level.

Figure 5:
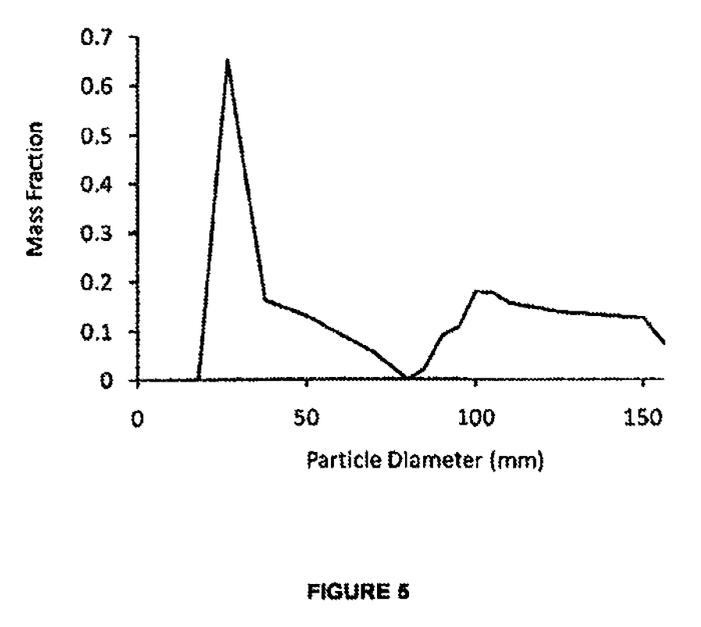
FIG. 5 is an example of a continuous particle size distribution for a mixture of particles having sizes from 8 mm to 65 mm.

An example of a broad continuous size range is illustrated in FIG. 5, where the particle sizes range from 18 mm to 165 mm. In one embodiment, the smallest particle size in the distribution is selected as the low end of the range for the finest grid, and the size ranges for the other grids are determined from this base. For example, using factors of 2, four grid levels would be used, respectively owning particles of size 18 to 36 mm, 36 to 72 mm, 72 to 144 mm and 144 to 288 mm. In an alternative example, using factors of the square root of 2, seven levels would be used, respectively owning particles of sizes 18 to 25 mm, to 36 mm, 36 to 51 mm, 51 to 72 mm, 72 to 102 mm, 102 to 144 mm, 144 to 203 mm.

In a preferred embodiment, the grid levels are analysed to determine whether any an underutilised, in the sense that they have low numbers of particles in comparison with the other levels. In the event that two or more adjacent levels are determined to be underutilised in this way, in a preferred embodiment, grid levels are merged. Returning to the particle size distribution shown in FIG. 5 and considering an initial grid level schema determined using 18 mm as the base size and a scale factor of 2, it may be seen that the fourth level owns particle sizes ranging from 144 to 288 mm. However, the largest particles in the distribution have size 165 mm, and the height of the distribution at this end is relatively low. Accordingly, there are relatively few particles in this grid level and more balanced grid levels may be obtained by merging levels 3 and 4 such that a single level owns particles ranging in size from 72 to 288 mm (or, effectively, 72 to 165 mm). As will be clear to the skilled addressee, whether localised dips in the distribution result in underutilisation of two or more adjacent grid levels will depend upon the number and span of grid levels initially selected. In the case of some distributions, therefore, electing to use a larger number of initial grid levels having narrower size ranges and merging where appropriate may result in more efficient processing. In some cases, it may further be determined that some grid levels include no particles and, in situations where there is no breakdown or agglomeration of particles, may be disregarded from further processing.

Once the particles are allocated to grid levels, and mapped into cells within those levels, searching is performed on each grid level and then on pairs of grid levels as discussed above. The neighbour list is progressively updated.

As discussed above, in at least some embodiments, the timing of a new search to re-build or update the neighbour list is decided on the basis of the distance threshold used to decide when pairs of entities are close enough to require inclusion in the neighbour list.

In some embodiments, this threshold distance is different for each grid level. For example, for naturally occurring distributions of rocks it is typically beneficial to choose the threshold to be dependent on the size of the cell used for that level, so the threshold becomes smaller as the particles become smaller.

The information contained in each grid level (and the dependent information in the neighbour list) can therefore have a different duration of validity. It is inefficient to do a global search (that is, a search performed over all levels of the grid hierarchy at one time) at the first occurrence of any of the grid data exceeding its time of validity, since most of the data still remains valid. In the preferred embodiment, therefore, a "partial search" is performed, where only the grid levels whose data has become invalid require its particles to be re-mapped to the respective grids. The partial search then performs a search for pairs on that grid level and then maps the cells from this grid level to the other unchanged grid levels to search for pairs between particles from the updated level and from each of the other levels. This enables the neighbour list to be updated without looking at a large fraction of the grid hierarchy.

In a particular embodiment in which the smallest grid has the smallest threshold and the threshold increases to the largest grid, a partial search may be considered to be a modification of the procedure shown in FIG. 3. Consider, for example, the situation where in a simulation having seven grid levels the neighbour lists in levels 1, 2 and 3 require updating. In this situation, the partial search procedure is as shown in FIG. 3, except that at step 206, the comparison performed is i<m, where m is the highest level requiring updating (in this case, 3). Thus, levels 1, 2 and 3 are each searched on their own and in combination with each of the higher levels; levels 4 to 7 are only searched in combination with one of levels 1 to 3. Other types of partial search are possible. For example, if it should arise that level 4 in a 7 level hierarchy requires updating, level 4 is searched alone and in combination with each of the other levels.

The determination of the time of validity is typically based on an estimate of the maximum time that can elapse before a pair can make contact by moving a sufficient distance but which have not previously been identified by the search for inclusion in the neighbour list (which would then result in a missed collision). This time is typically estimated by dividing the threshold distance for a grid level by the maximum approach speed in the system.

In some such embodiments, a separate estimate of the maximum approach speed is used for each of the grid levels based upon knowledge of the speed characteristics of the particles allocated to the grid levels. The time of validity is then the ratio of the grid level threshold and the grid level maximum approach speed. This allows longer validity estimates for all grid levels except for the one that has the overall maximum approach speed. Using this approach, the partial searches for all other levels can be further delayed further reducing the cost of the overall search or neighbour list update.

Another alternative for the update process for the neighbour list is not to rely on a search (global or partial) to do all the updates, but to perform a "local search" in some circumstances, as discussed below. A local search is a search of a specific area of the simulation space. In some cases, the maximum approach velocity in the system occurs only for a small number of particle pairs at any one time. The vast majority of pairs have significantly lower approach speeds. In this further alternative, of particular use where the speed distribution of the entities has a long tail (e.g. a Maxwell-Boltzmann distribution), a much smaller characteristic velocity can be used to determine the length of validity of the grid levels and neighbour list which gives a significantly longer period between global or partial search updates leading to additional reduction in computational cost. A small number of particles move faster than this characteristic speed. These particles can only affect their local neighbours on this timescale. The search level to which these particles belong can be locally updated just around these "fast" particles. Local searches are then performed on appropriate combinations of grid levels to update pairs in the neighbour list including these fast particles. The frequency of these local searches is the same as the search/update frequency would have been for the global search, had the speed of the fast particles been used to determine the period of validity of the neighbour list. This alternative means that a reasonable fraction of the full global or partial searches can be replaced by very inexpensive local updates of the grid levels of just fast particles and then using local searches of the associated grid levels to locally repair the neighbour list.

The neighbour lists generated over time by the DEM process, and in particular the data produced for each time period representing the motion, the net forces, the torques the orientations and spin of the particles, and in particular their interaction with the boundary objects, is used by the particle simulation system 2100 to produce display data to generate user interface displays of the particles motion, interaction and collisions with other bodies. The displays are used to control and drive the performance of various mining, manufacturing and logistic operations, such as.

(i) Crushing and grinding of rocks in mineral processing. Data is produced on the flow and breakage of particles, improves process efficiency, production rate, equipment design and equipment wear.

(ii) Mixing of powders and grains for food, plastics, pharmaceuticals and household product manufacture. Data is produced on flow, mixing, particle growth, breakage and agglomeration to improve the mixing process and equipment design.

(iii) Transport and flow of particles through processing equipment. Data is produced to optimise equipment design;

(iv) Digging and excavation.

(v) Rock cutting and fragmentation. Data is produced to improve cutting efficiency and reduce equipment wear.

(vi) Landslides and debris flow. Data produced for planning, mitigation and disaster response management.

The neighbour lists and particle motion and collision data produced by the DEM process is also used by the particle simulation system 2100 to generate control data, which is transmitted over the network 2120 to equipment to control various actuators of the equipment that in turn control the above manufacturing and mining processes.

Many modifications will be apparent to those skilled in the art without departing from the scope of the present invention as hereinbefore described with reference to the accompanying drawings.

The invention claimed is:

1. A discrete element method executed by a particle simulation computer system to model granular or particulate material, the method comprising:
    performing, using one or more computer processing modules of the system a multiple hierarchical grid search method,
    wherein entities including particles of the material and boundary elements with which the particles can interact, are allocated to cells of respective grids based on size, and
    wherein the search method searches cells of grids in a grid hierarchy for proximity between entities, and comprises:
    (a) performing a search of cells in a first grid level of the grids to determine pairs of entities which satisfy predetermined criteria to be included in a neighbour list for which both entities belong to the first grid level;
    (b) mapping each non-empty cell in the first grid level to each of the other grid levels of the grids, determining neighbouring cells in each of the other grid levels and determining all pairs of entities belonging to a pair of levels that satisfy the predetermined criteria for inclusion in the neighbour list;
    (c) repeating (a) and (b) for all grid levels;
    (d) generating display data from the neighbour list; and
    (e) using the generated display data to provide a display of movement of said material over a period of time, wherein said display is used to improve performance of equipment operating on said material.

2. The discrete element method of claim 1, including performing the search method partially or locally at times based on duration of validity of data associated with the entities.

3. The discrete element method of claim 2, wherein said times are determined based on speeds of said entities.

4. The discrete element method of claim 1, including generating control data, based on the modelled motion of said material, to control equipment handling said material.

5. A particle simulation system including a computer configured to execute the discrete element method of claim 1.

6. Non-transitory computer readable storage including computer program code for performing the discrete element method of claim 1.

7. A discrete element method executed by a particle simulation computer system to model granular or particulate material, the method comprising:
performing, using one or more computer processing modules of the system a multiple grid search method, comprising the steps of:
(a) analysing a particle size distribution for particles of said material to be modelled;
(b) in dependence upon the particle size distribution, determining a grid hierarchy comprising a plurality of grid levels, each having a respective grid size, into which to map the particles including, for each grid level, determining a respective particle size range;
(c) mapping the particles into the plurality of grid levels in dependence upon their respective sizes and the particle size ranges associated with the grid levels;
(d) determining criteria for inclusion of a pair of particles in a neighbour list;
(e) searching each of the grid levels for pairs of particles satisfying the criteria for inclusion in the neighbour list, and searching each possible combination of two grid levels for pairs of particles satisfying the criteria for inclusion in the neighbour list;
(f) periodically examining the pairs of particles included in the neighbour list to determine whether they are in contact with one another;
(g) generating display data from the neighbour list; and
(h) using the generated display data to provide a display of movement of said material over a period of time, wherein said display is used to improve performance of equipment operating on said material.

8. The discrete element method of claim 7, wherein the step of determining a grid hierarchy comprising a plurality of grid levels includes determining each successive grid level to differ from a preceding level by a predetermined size factor.

9. The discrete element method of claim 8, wherein the step of determining a grid hierarchy comprising a plurality of grid levels includes determining for each grid level a respective particle size range such that the respective particle size range associated with each grid level includes the respective grid size of that grid level.

10. The discrete element method of claim 9, wherein the step of determining a grid hierarchy comprising a plurality of grid levels includes merging grid levels in dependence upon respective numbers of particles falling within the respective particle size ranges.

11. The discrete element method of claim 9, wherein the step of determining a grid hierarchy comprising a plurality of grid levels includes modifying the respective particle size ranges in dependence upon respective numbers of particles falling within them.

12. The discrete element method of claim 7, wherein the step of mapping the particles includes allocating each particle to the grid level whose particle size range includes the size of the particle, and mapping each particle to a single cell of the grid level to which it is allocated.

13. The discrete element method of claim 7, wherein the criteria for inclusion of a pair of particles within a neighbour list includes a closing speed of the pair of particles or a distance between the pair of particles or a time until collision of the particles.

14. The discrete element method of claim 13, including the step of determining a time of validity of the neighbour list.

15. The discrete element method of claim 14, including repeating the searching step upon expiry of the time of validity of the neighbour list.

16. The discrete element method of claim 14, including determining a plurality times of validity, each relating to a subset of the plurality of grid levels, and repeating the searching step in connection with the respective subset upon expiry of one of the plurality of times of validity.

17. The discrete element method of claim 14, wherein the neighbour list is valid for all particles.

18. The discrete element method of claim 14, wherein a respective additional time of validity is determined in connection with a particular particle, and including searching for pairs of particles including the particular particle, satisfying the criteria for inclusion in the neighbour list, upon expiry of the additional time of validity.

19. The discrete element method of claim 7, wherein the step of searching each possible combination of two grid levels includes mapping non-empty cells of one of the two grid levels into a relevant cell of the other of the two grid levels and searching for pairs of particles including one particle from each of the two grid levels which satisfy the criteria for inclusion in the neighbour list.

20. The discrete element method of claim 7, including the step of mapping a boundary element having a size falling within a size range of a grid level into that grid level, and wherein the searching step includes searching for particles which satisfy the criteria for inclusion in the neighbour list with the boundary element.

21. The discrete element method of claim 7, including the step of mapping a boundary element having a size larger than an upper bound of the size range allocated to a highest grid level into the highest grid level.

22. The discrete element method of claim 21, including mapping the boundary element into each cell of the largest grid level in which a part of the boundary element is found.

23. The discrete element method of claim 7, including generating control data, based on the modelled motion of said material, to control equipment handling said material.

24. A particle simulation system including a computer configured to execute the discrete element method of claim 7.

25. Non-transitory computer readable storage including computer program code for performing the discrete element method of claim 7.

* * * * *